(No Model.)
G. CROMPTON & H. WYMAN.
MECHANICAL MOVEMENT.
No. 339,047. Patented Mar. 30, 1886.
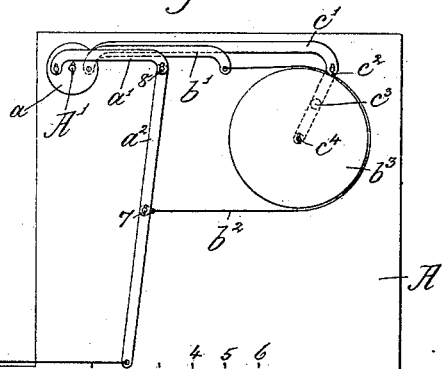
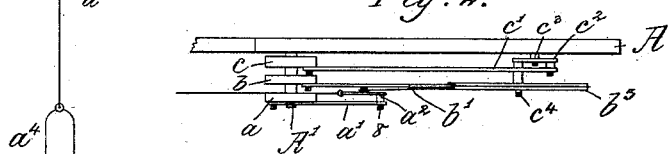
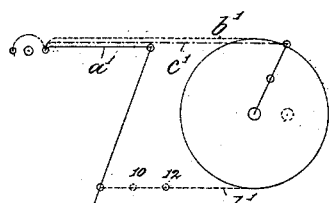
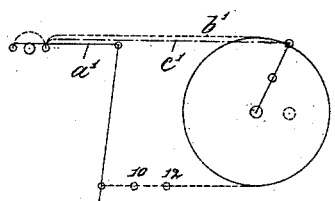
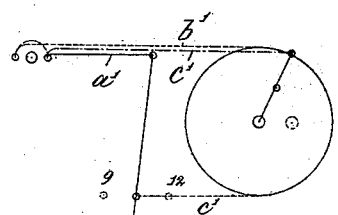
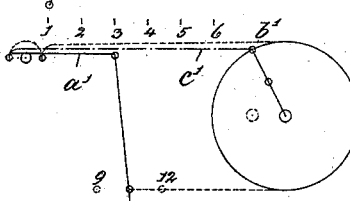
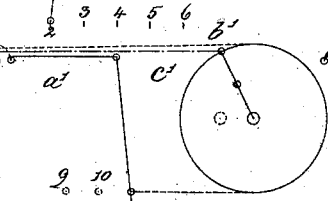
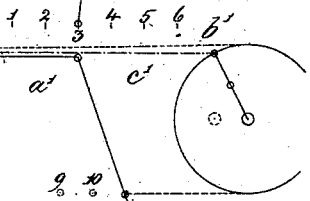
Witnesses.
Arthur Zipperlen.
John F.G. Prindlork.
Inventors.
George Crompton
Horace Wyman
by Crosby & Gregory Attys.

UNITED STATES PATENT OFFICE.

GEORGE CROMPTON AND HORACE WYMAN, OF WORCESTER, MASSACHUSETTS, ASSIGNORS TO SAID GEORGE CROMPTON.

MECHANICAL MOVEMENT.

SPECIFICATION forming part of Letters Patent No. 339,047, dated March 30, 1886.

Application filed January 22, 1886. Serial No. 189,434. (No model.)

*To all whom it may concern:*

Be it known that we, GEORGE CROMPTON and HORACE WYMAN, both of Worcester, county of Worcester, and State of Massachusetts, have invented an Improvement in Mechanical Movements, of which the following description, in connection with the accompanying drawings, is a specification, like letters on the drawings representing like parts.

This invention has for its object to provide a mechanical movement wherein the end of a lever may be left in any one of at least six positions and be moved in equal times from any one into any other of its six positions. To do this we have herein employed three semi-rotating cranks, three connecting-rods, and two levers, and a pulley or block, the latter having its fulcrum on one of the said levers.

This invention consists, essentially, in a combination of levers and cranks, substantially as hereinafter described, and designated in the claim at the end of this specification.

Figure 1, in side elevation, represents a mechanical movement embodying this invention; Fig. 2, a plan view of Fig. 1, the arm supporting the sheave being, however, broken off; and Figs. 3 to 8, inclusive, represent diagrams to illustrate the main lever in its six different positions.

Referring to the drawings, the frame A, supposed to represent part of the frame-work of a machine in which the mechanical movement herein to be described is to be used, has a stud, A', upon which, as herein shown, are mounted three wheels, $a$ $b$ $c$, which in practice will be toothed at their peripheries and will have imparted to them a semi-rotating movement, first in one and then in the opposite direction, as and by means substantially such as shown in Letters Patent No. 281,842, dated July 24, 1883. The crank-pin of the wheel $a$ has on it a connecting-rod, $a'$, which is jointed by a pin, 8, to the upper end of the main lever $a^2$—a lever of the third order—the lower end of which, or a part in connection therewith, is to be moved to occupy any one of six different positions. The wheel $c$ has a crank-pin, on which is placed the connecting-rod $c'$, jointed to the upper end of a lever of the first order, having its fulcrum at $c^3$, and having a stud, $c^4$, on which is mounted a pulley or block, $b^3$, partially surrounded by a cord or chain, $b^2$, connected at one end, as at 7, to the main lever $a^2$ of the third order, and at its other end to the outer end of the connecting-rod $b'$, placed on the crank-pin of the semi-rotating wheel $b$. Each connecting-rod may be reciprocated in the direction of its length for a distance due to the throw of the crank-pin with which it is attached. The lever $a$, at its lower end, has joined to it a cord or chain, $a^3$, which is kept under tension or strain by the thing to be moved over different distances and be left in any one of six positions, the cord or chain being herein shown as kept under strain by a weight, $a^4$, the cord or chain $a^3$ passing over a sheave, $a^5$, on a stud, $a^6$. The weight $a^4$ or thing to be moved is in practice more than sufficient to counterbalance the weight of the lever $a^2$, and the said lever having the cord or chain $b^2$ connected with it is kept from falling or moving in the direction of its length by the force of gravity alone. The pin 8, joining the upper end of the lever $a^2$ with the connecting-rod $a'$, constitutes a movable fulcrum for the said lever.

The diagram, Fig. 3, shows all the cranks and connecting-rods in their farthest positions to the right, the end of the main lever being in position at station 1. To place the lower end of the main lever in position at station 2, it is only necessary to turn the wheel $a$ and place its crank-pin to the left-hand side of the stud A', as in Figs. 1 and 4. To move the end of the lever $a^2$ from station 2 to station 3, it is only necessary to move the wheels $a$ and $b$, leaving the crank-pin of the wheel $a$ standing at the right-hand side and the crank-pin of the wheel $b$ at the left-hand side of the stud A', as in Fig. 5. To change the end of the lever $a^2$ from station 3 to station 4, it is necessary to turn this wheel $a$ and place its crank-pin to the left of stud A'; also to turn the wheel $c$, move the lever $c^2$ on its fulcrum $c^3$ from the position Fig. 5 to the position Fig. 6, and also to turn the wheel $b$ so that its crank-pin will stand at the right of stud A'. To move the lever $a^2$ from station 4 to station 5, or from the position shown in Fig. 6 to that shown in Fig. 7, the wheel $a$ is turned to place its crank-pin at the left of the said stud A', the pulley or block $b^3$ being thus partially rotated. To move the end of the lever $a^2$ from station 5 to station 6, all three of the wheels $a\ b\ c$ will be turned to place all their cranks to the left of the stud A', as in Fig. 8. The lever $a^2$, opposite the point 7, representing its junction with the chain or cord $b^2$, is made to occupy three different positions at the stations 9, 10, 12, as shown by the diagrams, and when in either of the said positions the lower end of the said lever $a^2$ may be moved by moving the wheel $a$.

In practice each wheel will be toothed and be mounted and made movable between its driving-gears, as shown in the patent referred to.

Among other things for which the mechanical movement herein described is especially applicable is the movement of shuttle-boxes in looms, or for the movement of a lever or rod which for any reason is at times to have a variable throw or stroke.

We claim—

The three wheels having crank-pins and three attached connecting-rods, combined with a main lever of the third order, a lever of the first order, a pulley or block mounted on and carried by the lever of the first order, and a cord or chain attached to one of the said connecting-rods and passed over the said pulley or block and joined to the said main lever, the semi-rotation of the said wheels in one or the other direction enabling the end of the said main lever to be left in any one of six positions, substantially as described.

In testimony whereof we have signed our names to this specification in the presence of two subscribing witnesses.

GEO. CROMPTON.
HORACE WYMAN.

Witnesses:
J. B. SYME,
J. A. WARE.